United States Patent
Chen

(10) Patent No.: US 12,279,330 B2
(45) Date of Patent: Apr. 15, 2025

(54) DISCONTINUOUS RECEPTION DRX CONFIGURATION METHOD AND TERMINAL

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 765 days.

(21) Appl. No.: 17/389,442

(22) Filed: Jul. 30, 2021

(65) Prior Publication Data

US 2021/0360736 A1    Nov. 18, 2021

Related U.S. Application Data

(63) Continuation of application No. PCT/CN2020/073784, filed on Jan. 22, 2020.

(30) Foreign Application Priority Data

Jan. 31, 2019 (CN) .......................... 201910100618.8

(51) Int. Cl.
 *H04W 76/28* (2018.01)
 *H04W 72/0453* (2023.01)
 *H04W 72/23* (2023.01)
 *H04W 80/02* (2009.01)

(52) U.S. Cl.
 CPC ....... *H04W 76/28* (2018.02); *H04W 72/0453* (2013.01); *H04W 72/23* (2023.01); *H04W 80/02* (2013.01)

(58) Field of Classification Search
 CPC . H04W 76/28; H04W 72/23; H04W 72/0453; H04W 80/02
 USPC .......................................................... 370/329
 See application file for complete search history.

(56) References Cited

U.S. PATENT DOCUMENTS

| | | | |
|---|---|---|---|
| 2008/0225772 A1* | 9/2008 | Xu | H04W 52/0216 370/313 |
| 2011/0105069 A1 | 5/2011 | Gaal et al. | |
| 2013/0016638 A1 | 1/2013 | Lee et al. | |
| 2013/0148574 A1 | 6/2013 | Liu et al. | |
| 2015/0003311 A1 | 1/2015 | Feuersaenger et al. | |
| 2015/0085712 A1 | 3/2015 | Wang et al. | |

(Continued)

FOREIGN PATENT DOCUMENTS

| | | |
|---|---|---|
| CA | 3065088 A1 | 12/2018 |
| CN | 102123456 A | 7/2011 |

(Continued)

OTHER PUBLICATIONS

Intel Corporation, "Support for UE Assistance Information for eDDA", 3GPP TSG RAN WG2 Meeting #77bis, Mar. 26-30, 2012, Jeju, Korea.

(Continued)

*Primary Examiner* — Chi Tang P Cheng
(74) *Attorney, Agent, or Firm* — Price Heneveld LLP

(57) ABSTRACT

The present invention provides a discontinuous reception DRX configuration method and a terminal. The method includes: when a terminal is configured with at least two sets of DRX parameters, performing a corresponding DRX process according to at least one set of the at least two sets of DRX parameters.

20 Claims, 2 Drawing Sheets

(56) References Cited

U.S. PATENT DOCUMENTS

| | | | |
|---|---|---|---|
| 2015/0201375 A1* | 7/2015 | Vannithamby | H04W 76/15 370/311 |
| 2017/0019948 A1 | 1/2017 | Baghel et al. | |
| 2018/0027424 A1 | 1/2018 | Chen et al. | |
| 2018/0220345 A1 | 8/2018 | Moon et al. | |
| 2019/0103953 A1* | 4/2019 | Liao | H04W 72/23 |
| 2020/0015312 A1 | 1/2020 | He et al. | |
| 2020/0100184 A1 | 3/2020 | Zhang | |
| 2020/0120596 A1 | 4/2020 | Yu et al. | |

FOREIGN PATENT DOCUMENTS

| | | |
|---|---|---|
| CN | 102883417 A | 1/2013 |
| CN | 102932882 A | 2/2013 |
| CN | 104219738 A | 12/2014 |
| CN | 106899941 A | 6/2017 |
| CN | 108200640 A | 6/2018 |
| CN | 108307547 A | 7/2018 |
| CN | 108616902 A | 10/2018 |
| CN | 108712773 A | 10/2018 |
| CN | 109246826 A | 1/2019 |
| JP | 2011050087 A | 3/2011 |
| JP | 2012526463 A | 10/2012 |
| JP | 2015526042 A | 9/2015 |
| WO | 2018059564 A1 | 4/2018 |
| WO | 2018218683 A1 | 12/2018 |

OTHER PUBLICATIONS

Vivo, "Techniques on UE adaptation to the traffic and UE power consumption characteristics", 3GPP TSG RAN WG 1 #94bis, Chengdu, China, Oct. 8-12, 2018.

* cited by examiner

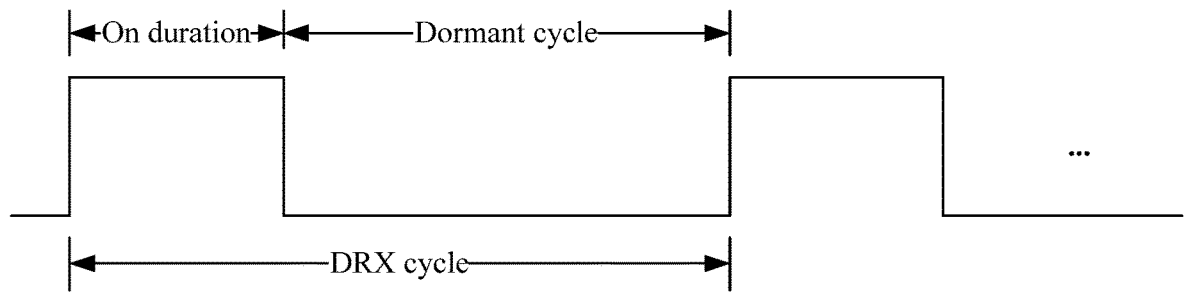
FIG. 1
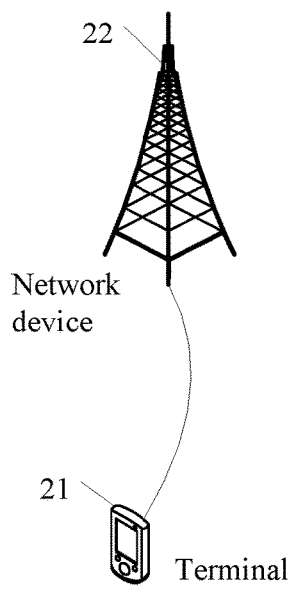
FIG. 2
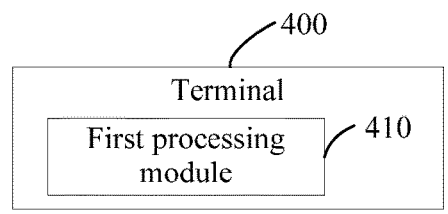
FIG. 3
FIG. 4

DISCONTINUOUS RECEPTION DRX CONFIGURATION METHOD AND TERMINAL

CROSS-REFERENCE OF RELATED APPLICATION

This application is a continuation application of International Application No. PCT/CN2020/073784 filed on Jan. 22, 2020, which claims priority to Chinese Patent Application No. 201910100618.8 filed in China on Jan. 31, 2019, both disclosures of which are incorporated herein by reference in their entireties.

TECHNICAL FIELD

The present disclosure relates to the field of communications technologies, and in particular, to a discontinuous reception DRX configuration method and a terminal.

BACKGROUND

The discontinuous reception (DRX) mechanism allows a terminal to periodically enter a sleep mode at certain times, without monitoring a physical downlink control channel (PDCCH) subframe, and when needing to monitor a PDCCH subframe, the terminal wakes up from the sleep mode, to save power. As shown in FIG. 1, continuous DRX cycles are divided in time domain, a DRX cycle includes an on duration and a dormant cycle (Opportunity for DRX). During the on duration, the terminal monitors a PDCCH. During the dormant cycle, the terminal does not monitor a PDCCH to save power. In the DRX cycle, if the terminal is in the on duration, a running cycle of an inactivity timer (Drx-Inactivity Timer), or a running cycle of a retransmission timer (drx-Retransmission Timer), the terminal needs to continuously detect a downlink PDCCH.

In related technologies, a mobile communication system has only two DRX configurations, namely, short DRX and long DRX, and the terminal can only activate one of the DRX configurations at each moment. In service scenarios insensitive to delays, one DRX configuration can meet multiple service requirements of a user terminal. The 5$^{th}$ generation (5G) mobile communication system, or called the new radio (NR) system needs to adapt to diverse scenarios and service requirements. Main scenarios of the NR system include enhanced Mobile Broadband (eMBB) communications, massive Machine Type Communications (mMTC) communications, and ultra-reliable and low latency communications (URLLC). These scenarios require for high reliability, low latency, large bandwidth, wide coverage, and the like of a system. Therefore, one DRX configuration cannot meet an application environment with diversified service requirements.

SUMMARY

According to a first aspect, an embodiment of the present disclosure provides a discontinuous reception DRX configuration method, applied to a terminal side and including:

when a terminal is configured with at least two sets of DRX parameters, performing a corresponding DRX process according to at least one set of the at least two sets of DRX parameters.

According to a second aspect, an embodiment of the present disclosure further provides a terminal, including:

a processing module, configured to: when a terminal is configured with at least two sets of DRX parameters, perform a corresponding DRX process according to at least one set of the at least two sets of DRX parameters.

According to a third aspect, an embodiment of the present disclosure provides a terminal. The terminal includes a processor, a memory, and a computer program stored in the memory and running on the processor. When the computer program is executed by the processor, the step of the foregoing discontinuous reception DRX configuration method is implemented.

According to a fourth aspect, an embodiment of the present disclosure provides a computer-readable storage medium. The computer-readable storage medium stores a computer program, and when the computer program is executed by a processor, the step of the foregoing discontinuous reception DRX configuration method is implemented.

BRIEF DESCRIPTION OF DRAWINGS

To better clarify the technical solution of the embodiments of the present disclosure, the accompanying drawings required to illustrate the embodiments of the present disclosure will be simply described below. Obviously, the accompanying drawings described below merely illustrate some embodiments of the present disclosure. Those ordinarily skilled in the art can obtain other accompanying drawings on the basis of those accompanying drawings.

FIG. 1 is a schematic diagram of a time-domain relationship of a DRX cycle;

FIG. 2 is a block diagram of a mobile communications system to which an embodiment of the present disclosure can be applied;

FIG. 3 is a schematic flowchart of a discontinuous reception DRX configuration method according to an embodiment of the present disclosure;

FIG. 4 is a schematic structural diagram of modules of a terminal according to an embodiment of the present disclosure.

DETAILED DESCRIPTION OF EMBODIMENTS

Figure 5:
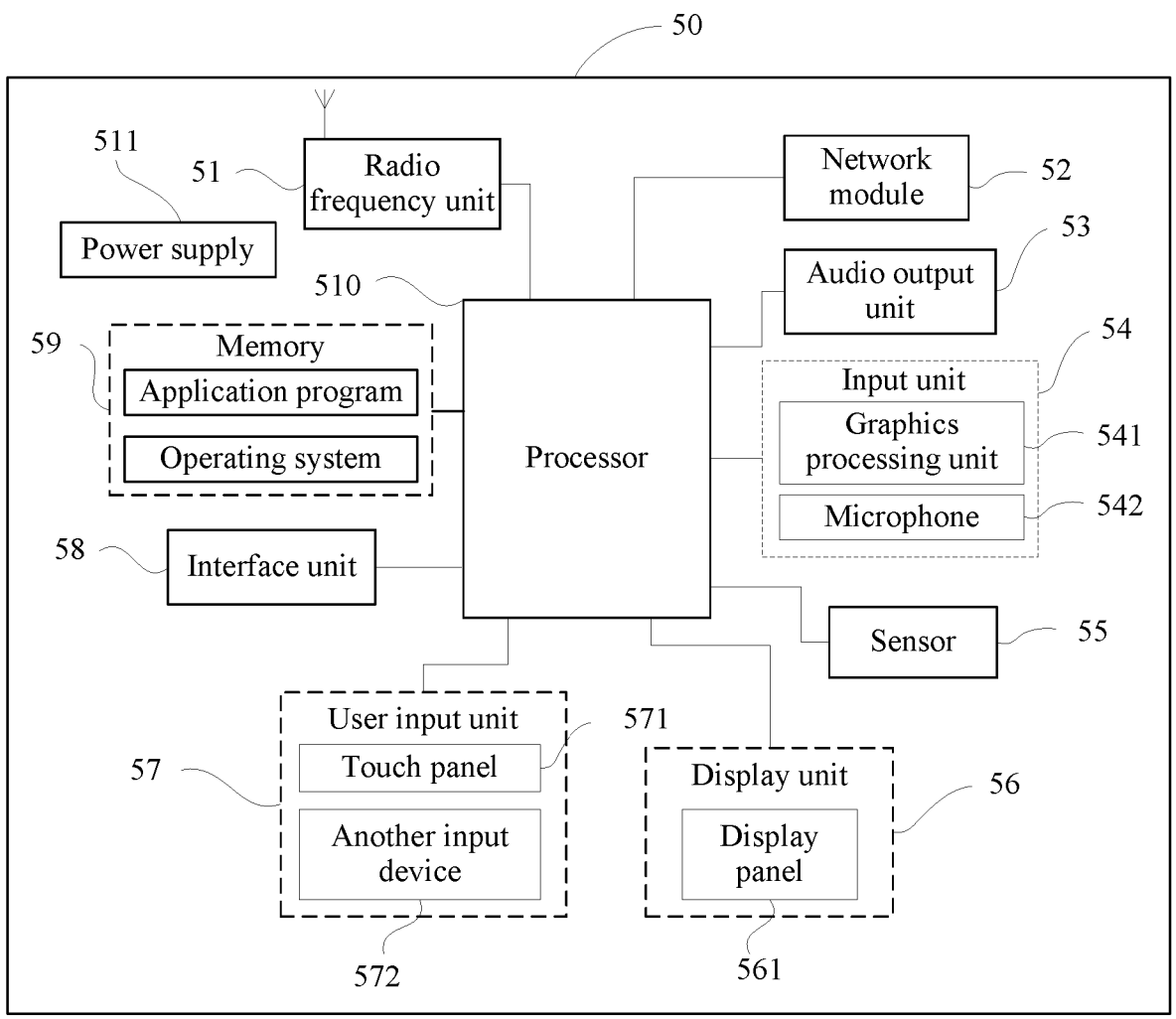
FIG. 5 is a block diagram of a terminal according to an embodiment of the present disclosure.

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, these embodiments are provided to enable a more thorough understanding of the present disclosure and to fully convey the scope of the present disclosure to those skilled in the art.

Terms "first,", "second", or the like in the specification and claims of this application are used to distinguish similar objects, instead of describing a specific sequence or order. It should be understood that the data termed in such a way is interchangeable in proper circumstances so that the embodiments of this application described herein can be implemented in an order other than the order illustrated or described herein. Moreover, the terms "include", "contain" and any variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. "And/or" used in the specification and claims means at least one of the connected objects.

The technology described in this specification is not limited to the Long Term Evolution (LTE)/LTE-Advanced (LTE-A) system. It can also be applied in various wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems. The terms "system" and "network" are often used interchangeably. The technology described herein can be used in the above-mentioned systems and radio technologies as well as other systems and radio technologies. However, an NR system is described in the following description for illustrative purposes, and an NR terminology is used in most of the following description, although these technologies can also be applied to applications other than the NR system application.

The following description provides examples and does not limit the scope, applicability, or configuration set forth in the claims. The functions and arrangements of the elements under discussion may be changed without departing from the spirit and scope of the present disclosure. In various examples, various procedures or components may be omitted, replaced, or added appropriately. For example, the described method may be performed in an order different from that described, and steps may be added, omitted, or combined. In addition, features described with reference to some examples may be combined in other examples.

Referring to FIG. 2, FIG. 2 is a block diagram of a wireless communications system to which an embodiment of the present disclosure can be applied. The wireless communications system includes a terminal 21 and a network device 22. The terminal 21 can also be called a terminal device or a user terminal (UE), and the terminal 21 may be a mobile phone, a tablet personal computer, a laptop computer, a personal digital assistant (PDA), a mobile internet device (MID), a wearable device, an on-board equipment or other terminal side devices. It should be noted that a specific type of the terminal 21 is not limited in embodiments of the present disclosure. The network device 22 may be a base station or a core network. The base station may be a base station of 5G and later releases (for example, a gNB and a 5G NR NB), or a base station in other communications systems (for example, an eNB, a WLAN access point, or other access points). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, or another appropriate term in the art. Provided that the same technical effects are achieved, the base station is not limited to specific technical vocabulary. It should be noted that in embodiments of the present disclosure, the base station in the NR system is merely used as an example, but does not limit a specific type of the base station.

The base station can communicate with the terminal 21 under the control of a base station controller. In various examples, the base station controller may be a part of the core network or some base stations. Some base stations can exchange control information or user data with the core network through backhaul. In some examples, some of these base stations may communicate directly or indirectly with each other through a backhaul link, and the backhaul link may be a wired or wireless communication link. The wireless communications system can support operations on multiple carriers (waveform signals of different frequencies). A multi-carrier transmitter can simultaneously transmit a modulated signal on the multiple carriers. For example, each communication link may be a multi-carrier signal modulated based on various radio technologies. Each modulated signal can be sent over different carriers and can carry control information (for example, a reference signal or a control channel), overhead information, data, and the like.

The base station can wirelessly communicate with the terminal 21 via one or more access point antennas. Each base station may provide communication coverage for a corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

A communication link in the wireless communications system may include an uplink for carrying uplink (UL) transmission (for example, from the terminal 21 to the network device 22) or a downlink for carrying downlink (DL) transmission (for example, from the network device 22 to the terminal 21). The UL transmission may also be referred to as reverse link transmission, and the DL transmission may also be referred to as forward link transmission. The downlink transmission may be performed in a licensed band, an unlicensed band, or both. Similarly, the uplink transmission may be performed in a licensed band, an unlicensed band, or both.

An embodiment of the present disclosure provides a discontinuous reception DRX configuration method, applied to a terminal. As shown in FIG. 3, the method includes the following steps:

Step 31: When a terminal is configured with at least two sets of DRX parameters, perform a corresponding DRX process according to at least one set of the at least two sets of DRX parameters.

The DRX process refers to a running state of a DRX-related timer on the terminal side. The reconfiguration or change of the DRX parameter refers to reconfiguring or changing the DRX parameter for the terminal side by using RRC message or a MAC CE or DCI, or the like. Specifically, the terminal is configured with the at least two sets of DRX parameters, and DRX parameters corresponding to different terminal states or different services can be different. For example, DRX parameter 1 is used when the terminal is in state 1, and DRX parameter 2 is used when the terminal is in state 2.

The at least two sets of DRX parameters of the terminal can be configured by a network device. Specifically, before step 31, the method further includes: receiving configuration information of the at least two sets of DRX parameters from the network device side. The network device can configure the at least two sets of DRX parameters for the terminal by using a radio resource control (RRC) message. Each set of DRX parameters can include: on duration, a short DRX cycle, a long DRX cycle, duration of a relevant timer, and the like. The relevant timer includes, but not limited to a DRX on duration timer, a DRX inactivity timer, a DRX retransmission timer, and the like.

A timer parameter corresponding to the DRX on duration timer indicates online time after the terminal wakes up in a DRX cycle. A number of PDCCH subframes can be used as a basic unit for the timer parameter, for example, psf6 indicates that duration of online monitoring of the terminal is 6 PDCCH subframes. When the terminal meets a DRX cycle condition, enter the on duration timer.

A timer parameter corresponding to the DRX inactivity timer indicates a number of PDCCH subframes that the terminal further needs to continue to monitor after the terminal successfully decodes a PDCCH. A number of PDCCH subframes can also be used as a basic unit for the timer parameter, for example, psf80 indicates that the terminal further needs to continue to monitor 80 downlink PDCCH subframes before entering a sleep mode. When new uplink or down transmission is indicated in a PDCCH subframe, the DRX inactivity timer is started, and the timer is stopped when receiving a control element (CE) of an advance signal indication (for example, Go-To-Sleep)

The timer parameter corresponding to the DRX retransmission timer is used in a scenario of downlink retransmission, and indicates a maximum number of PDCCH subframes that the terminal needs to continuously monitor to receive expected downlink retransmission data. A number of PDCCH subframes can also be used as a basic unit for the timer parameter, for example, psf8 indicates that the terminal further needs to continue to wait for a maximum of 8 downlink PDCCH subframes to receive expected downlink retransmission data.

In an embodiment of the present disclosure, a DRX parameter can be changed, and the change can be triggered by the terminal autonomously or triggered by the network device. For example, in this embodiment, the network device triggers change of a DRX parameter. Step 31 includes: when a DRX parameter is reconfigured or changed in the discontinuous reception DRX process, continuing to perform the corresponding DRX process according to at least one of a first DRX parameter or a second DRX parameter.

The first DRX parameter is a DRX parameter before reconfiguration or before change, and the second DRX parameter is a DRX parameter after reconfiguration or after change. Cases of changing a DRX parameter in the discontinuous reception DRX process include, but are not limited to: the terminal receives a DRX parameter change instruction in a DRX cycle, or the terminal autonomously triggers change of a DRX parameter in a certain DRX cycle, or the like. Optionally, in the embodiments of the present disclosure, when a DRX parameter is changed in the DRX process, the terminal continues to perform the corresponding DRX process according to at least one of a first DRX parameter or a second DRX parameter of the at least two sets of DRX parameters; The first DRX parameter is a DRX parameter before change, and the second DRX parameter is a DRX parameter after change.

In an embodiment of the present disclosure, the DRX change can be triggered by the terminal autonomously or triggered by the network device. For example, in this embodiment, the network device triggers change of a DRX parameter. Before step 31, the method can further include: receiving change indication information of the DRX parameter; where the change indication information carries indication information for indicating the first DRX parameter and/or the second DRX parameter, and the indication information explicitly or implicitly indicates the reconfigured or changed DRX parameter. For example, the indication information implicitly indicates the reconfigured or changed DRX parameter. The change indication information carries bandwidth part BWP switching information. After the step of receiving change indication information of the DRX parameter, the method further includes: switching a current BWP to a target BWP according to the BWP switching information, and using a DRX parameter corresponding to the target BWP. The change indication information is used to indicate that a DRX parameter of the terminal is changed. Specifically, the step of receiving the change indication information of the DRX parameter can be performed in but not limited to one of the following manners:

Manner 1: receiving downlink control information (DCI) used to explicitly or implicitly indicate change of the DRX parameter.

This manner is to change configuration of the DRX parameter through DCI. For example, the DCI explicitly indicates the change of the DRX parameter. The DCI can carry the changed second DRX parameter. Specifically, after the network device is configured with multiple sets of DRX parameters, DCI is used to activate and/or deactivate different DRX parameter configurations. If a certain set of DRX parameter configuration is activated, the newly activated DRX parameter configuration takes effect in a current cell or bandwidth part (BWP). If a certain set of DRX parameter configuration is deactivated, the corresponding DRX parameter configuration is invalid in a current cell or BWP.

For example, DCI implicitly indicates the change of the DRX parameter. The DCI carries bandwidth part BWP switching information, where the BWP switching information is used to indicate the target BWP after switching, and the target BWP corresponds to the changed DRX parameter. In this manner, the DCI can be used to switch the BWP, thereby switching a DRX parameter configuration. Specifically, when the BWP switches, a DRX parameter corresponding to a BWP configuration takes effect.

Manner 2: receiving a media access control control element (MAC CE) used to explicitly or implicitly indicate change of the DRX parameter.

This manner is similar to manner 1. This manner is to change configuration of the DRX parameter through a MAC CE. For example, the MAC CE explicitly indicates the change of the DRX parameter. The MAC CE can carry the changed second DRX parameter. Specifically, after the network device is configured with multiple sets of DRX parameters, the MAC CE is used to activate and/or deactivate different DRX parameter configurations. If a certain set of DRX parameter configuration is activated, the newly activated DRX parameter configuration takes effect in a current cell or bandwidth part (BWP). If a certain set of DRX parameter configuration is deactivated, the corresponding DRX parameter configuration is invalid in a current cell or BWP.

For example, the MAC CE implicitly indicates the change of the DRX parameter. The MAC CE carries bandwidth part BWP switching information, where the BWP switching information is used to indicate the target BWP after switching, and the target BWP corresponds to the changed DRX parameter. In this manner, the MAC CE can be used to switch the BWP, thereby switching a DRX parameter configuration. Specifically, when the BWP switches, a DRX parameter corresponding to a BWP configuration takes effect.

Manner 3: receiving a radio resource control RRC message used to explicitly or implicitly indicate change of the DRX parameter.

This manner is similar to both manner 1 and manner 2. This manner is to change configuration of the DRX parameter through RRC. For example, the RRC explicitly indicates the change of the DRX parameter. The RRC can carry the changed second DRX parameter. Specifically, after the network device is configured with multiple sets of DRX parameters, RRC is used to activate and/or deactivate different DRX parameter configurations. If a certain set of DRX parameter configuration is activated, the newly activated DRX parameter configuration takes effect in a current cell or bandwidth part (BWP). If a certain set of DRX parameter configuration is deactivated, the corresponding DRX parameter configuration is invalid in a current cell or BWP.

For example, RRC implicitly indicates the change of the DRX parameter. The RRC carries bandwidth part BWP switching information, where the BWP switching information is used to indicate the target BWP after switching, and the target BWP corresponds to the changed DRX parameter. In this manner, the RRC can be used to switch the BWP, thereby switching a DRX parameter configuration. Specifically, when the BWP switches, a DRX parameter corresponding to a BWP configuration takes effect.

Manner 4: receiving an advance signal indication. When the terminal receives the advance signal indication, the terminal continues to perform a corresponding DRX process according to at least one set of the at least two sets of DRX parameters of the terminal.

Furthermore, the changed second DRX parameter can be used when performing the corresponding DRX process.

The above describes the scenario where the network device triggers reconfiguration or change of the DRX parameter. For example, in the embodiment below, the terminal autonomously triggers change of the DRX parameter. Step 31 includes: selecting a corresponding DRX parameter (corresponding to a state or a service of the terminal) from the at least two sets of DRX parameters according to a state or a service of the terminal, and performing the DRX process. For example, DRX parameter 1 is used when the terminal is in state 1, and DRX parameter 2 is used when the terminal is in state 2. The state of the terminal includes at least one of the following:

after a DRX on duration timer starts or when a DRX on duration timer runs;
after a DRX inactivity timer starts or when a DRX inactivity timer runs; or
after a DRX retransmission timer starts or when a DRX retransmission timer runs.

The above introduces the situation of changing a DRX parameter in the discontinuous reception DRX process, and the following embodiments of the present disclosure further introduce an implementation of how to continue to perform the corresponding DRX process according to at least one set of the at least two sets of DRX parameters of the terminal.

Optionally, the first DRX parameter is a DRX parameter before change, and the second DRX parameter is a DRX parameter after change. Step 31 includes: when a DRX parameter changes in the discontinuous reception DRX process, performing one of the following behaviors:

Behavior 1: continuing to run a timer in the DRX process according to at least one of a first DRX parameter or a second DRX parameter.

When the DRX parameter is changed (including RRC reconfiguration message, MAC CE or DCI indicates the switching of a DRX parameter), the DRX process corresponding to the terminal remains unchanged, that is, the relevant timer that already runs continues to run.

This behavior 1 includes but is not limited to one of the following behaviors of the terminal:

1: according to the first DRX parameter, continuing to run a first timer that already runs in the DRX process.

2: according to the first DRX parameter, continuing to run a first timer that already runs in the DRX process and a second timer after the first timer.

This manner means that when the DRX parameter is changed, the DRX process corresponding to the terminal remains unchanged, and the first DRX parameter before the change is still used, and the relevant timer that already runs is still used.

Further, after the step of according to the first DRX parameter, continuing to run a first timer that already runs in the DRX process and a second timer after the first timer, the method further includes: according to the second DRX parameter, performing an $N^{th}$ DRX process after the DRX process, where N is an integer greater than or equal to 1. That is, when a DRX parameter in a DRX process changes, the terminal continues to run the current DRX process by using the first DRX parameter before the change, and uses the changed second DRX parameter when the $N^{th}$ DRX process after the current DRX process starts. That is, the new DRX parameter is used in a subsequent DRX cycle (such as the next DRX cycle).

3: according to the second DRX parameter, continuing to run a first timer that already runs in the DRX process.

4: according to the second DRX parameter, continuing to run a first timer that already runs in the DRX process and a second timer after the first timer.

In this manner, when a DRX parameter in a DRX process changes, the terminal uses the new DRX parameter configuration in the current DRX cycle. That is, when a DRX parameter in a DRX process changes, the terminal continue to run the first timer that already runs in the current DRX process and the second timer after the first timer by using the changed second DRX parameter.

5: according to the first DRX parameter, continuing to run a first timer that already runs in the DRX process, and according to the second DRX parameter, running the second timer after the first timer.

In this manner, when a DRX parameter in a DRX process changes, the terminal uses the changed DRX parameter after the current DRX cycle does not affect a timer that already runs in the DRX. That is, when a DRX parameter in a DRX process changes, the terminal continues to run a first timer that already runs in the current DRX process by using the first DRX parameter before the change, and runs the second timer after the first timer by using the changed second DRX parameter.

Behavior 2: restarting a timer in the DRX process according to at least one of a first DRX parameter or a second DRX parameter.

When the DRX parameter is changed (including RRC reconfiguration, MAC CE or DCI indicates the switching of a DRX parameter), the terminal restarts the timer in the corresponding DRX process, for example, restarts the timer that already runs in the DRX process. The behavior 2 includes but is not limited to: restarting a first timer that already runs in the DRX process. That is, when a DRX parameter in a DRX process changes, the terminal restarts the first timer that already runs.

Further, the new DRX parameter can be used to restart the first timer that already runs in the DRX process, that is, according to the second DRX parameter, the first timer that already runs in the DRX process can be restarted.

Behavior 3: stopping the DRX process, and performing a new DRX process according to the second DRX parameter.

When the DRX parameter is changed (including RRC reconfiguration, MAC CE or DCI indicates the switching of a DRX parameter), the terminal stops the corresponding DRX process and uses the new DRX parameter.

Behavior 4: entering a dormant cycle of a DRX cycle, or monitoring a physical downlink control channel PDCCH.

For example, when the terminal receives the advance signal indication, the terminal enters a dormant cycle of a DRX cycle, or monitors a physical downlink control channel PDCCH. Further, the changed second DRX parameter is used in both the sleep cycle of the DRX cycle and the monitoring of the PDCCH. That is, when the terminal receives an advance signal indication (such as go-to-sleep), according to the advance indication signal, the terminal enters the dormant cycle or enters the state of PDCCH monitoring by using the second DRX parameter. Alternatively, the terminal can enter the dormant cycle of the DRX cycle, or monitor the physical downlink control channel PDCCH when receiving DCI, a MAC CE, or an RRC message indicating change of a DRX parameter in the DRX process.

The relevant timer in the DRX process includes but is not limited to: at least one of a DRX on duration timer, a DRX inactivity timer, or a DRX retransmission timer. The first timer that already runs in the DRX process can also include: at least one of a DRX on duration timer, a DRX inactivity timer, or a DRX retransmission timer.

For example, the behavior of the terminal is restarting the timer. When the first timer is the DRX inactivity timer, when the DRX parameter in a certain DRX process changes, the terminal restarts the DRX inactivity timer that already runs in the DRX process. Furthermore, the changed DRX parameter is used for the restarted DRX inactivity timer. For example, when a DRX parameter changes in a DRX process, when receiving scheduled DCI, or when receiving DCI, a MAC CE, or an RRC message used to indicate the change of the DRX parameter, restarting a DRX inactivity timer that already runs in the DRX process. That is, if the MAC CE or DCI indicating change of the DRX parameter is received during running of the drx-inactivity timer, the terminal restarts the drx-inactivity timer. Further, the terminal can restart the drx-inactivity timer by using the changed DRX parameter. Alternatively, further, if receiving DCI with a grant or DCI indicating change of a DRX configuration parameter, the terminal restarts the drx-inactivity timer.

Optionally, for example, the behavior of the terminal is restarting the timer. When the first timer is the DRX retransmission timer, when the DRX parameter in a certain DRX process changes, the terminal restarts the DRX retransmission timer that already runs in the DRX process. Furthermore, the changed DRX parameter is used for the restarted DRX retransmission timer. Specifically, the step of restarting the first timer that already runs in the DRX process includes: when receiving change indication information of the DRX parameter during running of the DRX retransmission timer, restarting at least one of the DRX inactivity timer or the DRX retransmission timer in the DRX process. That is, if the MAC CE or DCI indicating change of the DRX parameter is received during running of drx-retransmission timer, at least one of drx-inactivity timer or drx-retransmission timer is restarted. Further, the terminal restarts at least one of the DRX inactivity timer or the DRX retransmission timer according to the second DRX parameter. In other words, the changed DRX parameter can be used to restart at least one of drx-inactivity timer or drx-retransmission timer.

The above introduces a specific implementation of continuing to perform the corresponding DRX process according to at least one set of the at least two sets of DRX parameters of the terminal when a DRX parameter of the terminal changes in the discontinuous reception DRX process, and the following embodiments further introduce a behavior of the terminal after the terminal receives an advance signal indication in a process of performing the DRX process.

Specifically, if the terminal receives DCI, a MAC CE, or an RRC message indicating change of the DRX parameter in the DRX process, the terminal can restart or stop at least one of DRX-related timers running in the DRX process; or the terminal can enter a sleep mode or enter a state of PDCCH monitoring. In addition, if the terminal receives an advance signal indication (for example, go-to-sleep) in the DRX process, the terminal can also restart or stop at least one of DRX-related timers running in the DRX process; or the terminal can enter a sleep mode or enter a state of PDCCH monitoring. Further, the changed second DRX parameter is used for all the timer parameter in the DRX process, the sleep cycle of the DRX cycle and the monitoring of the PDCCH.

In the discontinuous reception DRX configuration method of the embodiments of the present disclosure, the terminal is configured with multiple sets of DRX parameters, and when the terminal is in different states or performs different services, a DRX parameter can be changed to adapt to performance requirements of different states or different services.

The foregoing embodiments describe the discontinuous reception DRX configuration method in different scenarios. The following further describes the corresponding terminal with reference to the accompanying drawings.

As shown in FIG. 4, the terminal 400 of the embodiment of the present disclosure can perform details of the method in the foregoing embodiment: when a terminal is configured with at least two sets of DRX parameters, performing a corresponding DRX process according to at least one set of the at least two sets of DRX parameters. The same effect can be achieved. The terminal 400 specifically includes the following functional modules:

a first processing module 410, configured to: when a terminal is configured with at least two sets of DRX parameters, perform a corresponding DRX process according to at least one set of the at least two sets of DRX parameters.

The first processing module 410 includes:

a first processing submodule, configured to select a corresponding DRX parameter from the at least two sets of DRX parameters according to a state or a service of the terminal, and perform the DRX process.

The state of the terminal includes at least one of the following:

after a DRX on duration timer starts or when a DRX on duration timer runs;

after a DRX inactivity timer starts or when a DRX inactivity timer runs; or after a DRX retransmission timer starts or when a DRX retransmission timer runs.

The terminal 400 further includes:
a first receiving module, configured to receive configuration information of the at least two sets of DRX parameters from a network device side.

The first processing module 410 further includes:
a second processing submodule, configured to: when a DRX parameter is reconfigured or changed in the discontinuous reception DRX process, continue to perform the corresponding DRX process according to at least one of a first DRX parameter or a second DRX parameter;

The first DRX parameter is a DRX parameter before reconfiguration or before change, and the second DRX parameter is a DRX parameter after reconfiguration or after change.

The terminal 400 further includes:
a second receiving module, configured to receive change indication information of the DRX parameter.

The terminal 400 further includes:
a second processing module, configured to enter a dormant cycle of a DRX cycle, or monitor a physical downlink control channel PDCCH.

The second receiving module includes one of the following:
a first receiving submodule, configured to receive downlink control information DCI used to explicitly or implicitly indicate change of the DRX parameter;
a second receiving submodule, configured to receive a media access control control element MAC CE used to explicitly or implicitly indicate change of the DRX parameter;
a third receiving submodule, configured to receive a radio resource control RRC message used to explicitly or implicitly indicate change of the DRX parameter; or
a fourth receiving submodule, configured to receive an advance signal indication.

The terminal 400 further includes:
a third processing module, configured to: when the change indication information carries bandwidth part BWP switching information, switch a current BWP to a target BWP according to the BWP switching information, and use a DRX parameter corresponding to the target BWP.

The second processing submodule is specifically configured to perform one of the following behaviors:
continuing to run a timer in the DRX process according to at least one of a first DRX parameter or a second DRX parameter;
restarting a timer in the DRX process according to at least one of a first DRX parameter or a second DRX parameter; or
stopping the DRX process, and performing a new DRX process according to the second DRX parameter.

The second processing submodule includes one of the following:
a first processing unit, configured to: according to the first DRX parameter, continue to run a first timer that already runs in the DRX process and a second timer that is not run;
a second processing unit, configured to: according to the second DRX parameter, continue to run a first timer that already runs in the DRX process and a second timer that is not run; or
a third processing unit, configured to: according to the first DRX parameter, continue to run a first timer that already runs in the DRX process, and according to the second DRX parameter, run the second timer that is not run in the DRX process.

The first processing module further includes:
a third processing submodule, configured to: run the timer in the DRX process according to the second DRX parameter from an $N^{th}$ DRX process after the DRX process; where N is an integer greater than or equal to 1.

The timer includes: at least one of a DRX on duration timer, a DRX inactivity timer, or a DRX retransmission timer.

The second processing submodule further includes:
a fourth processing unit, configured to restart a first timer that already runs in the DRX process.

The first timer is the DRX inactivity timer, and the fourth processing unit includes:
a first processing subunit, configured to: when receiving scheduled DCI, or when receiving DCI, a MAC CE, or an RRC message used to indicate the change of the DRX parameter, restart a DRX inactivity timer that already runs in the DRX process.

Further, the first processing subunit is specifically configured to: use the second DRX parameter to restart the DRX inactivity timer.

The first timer is the DRX retransmission timer, and the fourth processing unit includes:
a second processing subunit, configured to: when receiving change indication information of the DRX parameter during running of the DRX retransmission timer, restart at least one of the DRX inactivity timer or the DRX retransmission timer in the DRX process.

Further, the second processing subunit is specifically configured to: restart at least one of the DRX inactivity timer or the DRX retransmission timer according to the second DRX parameter.

It should be noted that the terminal of the embodiments of the present disclosure is configured with multiple sets of DRX parameters, and when the terminal is in different states or performs different services, a DRX parameter can be changed to adapt to performance requirements of different states or different services.

It should be noted that, division of the modules of the terminal is merely logical function division, and in actual implementation, the modules may be all or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementations of other modules are similar thereto. In addition, all or some of these modules may be integrated together or implemented independently. The processing element herein may be an integrated circuit having a signal processing capability. During implementation, the steps of the foregoing method or the foregoing modules can be completed by hardware integrated logic circuits in the processor element or indications in the form of software.

For example, the above modules can be configured into one or more integrated circuits to perform the above methods, such as: one or more application specific integrated circuits (ASIC), one or more digital signal processors (DSP), one or more field programmable gate arrays (FPGA), or the like. For another example, when a module above is implemented by invoking program code by using a processing element, the processing element may be a general-purpose processor, for example, a central processing unit (CPU) or another processor that can invoke program code. For another example, these modules may be integrated together and implemented in the form of a system-on-a-chip (SOC).

To better implement the foregoing objective, further, FIG. 5 is a schematic structural diagram of hardware of a terminal according to the embodiments of the present disclosure. A terminal 50 includes, but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. A person skilled in the art may understand that the structure of the terminal shown in FIG. 5 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, a vehicle-mounted terminal, a wearable device, a pedometer, and the like.

The radio frequency unit 51 is configured to send and receive data under the control of the processor 510.

The processor 510 is configured to: when a terminal is configured with at least two sets of DRX parameters, perform a corresponding DRX process according to at least one set of the at least two sets of DRX parameters.

The terminal of the embodiments of the present disclosure is configured with multiple sets of DRX parameters, and when the terminal is in different states or performs different services, a DRX parameter can be changed to adapt to performance requirements of different states or different services.

It should be understood that in this embodiment of the present disclosure, the radio frequency unit 51 may be configured to receive and send signals in a process of receiving and sending information or calling. Specifically, after receiving downlink data from a base station, the radio frequency unit 51 sends the downlink data to the processor 510 for processing; and sends uplink data to the base station. Generally, the radio frequency unit 51 includes but is not limited to an antenna, at least one amplifier, a transceiver, a coupler, a low noise amplifier, a duplexer, and the like. In addition, the radio frequency unit 51 may further communicate with other devices through a wireless communications system and network.

The terminal provides wireless broadband Internet access to a user through the network module 52, for example, helps the user receive and send e-mails, browse web pages, and access streaming media.

The audio output unit 53 may convert, into an audio signal, audio data received by the radio frequency unit 51 or the network module 52 or stored in the memory 59, and output the audio signal as sound. Moreover, the audio output unit 53 may further provide audio output (for example, call signal receiving sound and message receiving sound) related to a specific function performed by the terminal 50. The audio output unit 53 includes a loudspeaker, a buzzer, a receiver, and the like.

The input unit 54 is configured to receive an audio or video signal. The input unit 54 may include a graphics processing unit (GPU) 541 and a microphone 542. The graphics processing unit 541 processes image data of a static picture or a video obtained by an image capture apparatus (for example, a camera) in video capture mode or image capture mode. A processed image frame can be displayed on the display unit 56. The image frame processed by the graphics processing unit 541 can be stored in the memory 59 (or another storage medium) or sent via the radio frequency unit 51 or the network module 52. The microphone 542 may receive a sound and can process such sound into audio data. Processed audio data may be converted, in telephone call mode, into a format that can be sent to a mobile communication base station via the radio frequency unit 51 for output.

The terminal 50 further includes at least one sensor 55, for example, a light sensor, a motion sensor, and other sensors. Specifically, the light sensor includes an ambient light sensor and a proximity sensor. The ambient light sensor can adjust a brightness of a display panel 561 based on a brightness of ambient light. The proximity sensor can close the display panel 561 and/or backlight when the terminal 50 moves to an ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 55 may also include a fingerprint sensor, a pressure sensor, an iris sensor, a molecular sensor, a gyroscope, a barometer, a hygrometer, a thermometer, an infrared sensor, and the like. Details are not described herein.

The display unit 56 is configured to display information entered by a user or information provided for the user. The display unit 56 may include a display panel 561, and the display panel 561 may be configured in a form of a liquid crystal display (LCD), an organic light-emitting diode (OLED), or the like.

The user input unit 57 may be configured to receive inputted digit or character information and generate key signal input related to user setting and function control of the terminal. Specifically, the user input unit 57 includes a touch panel 571 and other input devices 572. The touch panel 571 is also referred to as a touchscreen, and may collect a touch operation performed by a user on or near the touch panel 571 (such as an operation performed by a user on the touch panel 571 or near the touch panel 571 by using any proper object or accessory, such as a finger or a stylus). The touch panel 571 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 510, and can receive and execute a command sent by the processor 510. In addition, the touch panel 571 may be of a resistive type, a capacitive type, an infrared type, a surface acoustic wave type, or the like. In addition to the touch panel 571, the user input unit 57 may also include the another input device 572. Specifically, the another input device 572 may include but is not limited to a physical keyboard, a function key (such as a volume control key or a power on/off key), a trackball, a mouse, a joystick, and the like. Details are not described herein.

Further, the touch panel 571 may cover the display panel 561. When the touch panel 571 detects touch operations thereon or nearby, the touch panel 571 transmits the touch operations to the processor 510 to determine a type of a touch event. Subsequently, the processor 510 provides corresponding visual output on the display panel 561 according to the type of the touch event. In FIG. 5, the touch panel 571 and the display panel 561 are used as two independent components to implement input and output functions of the terminal. However, in some embodiments, the touch panel 571 and the display panel 561 may be integrated to implement the input and output functions of the terminal. This is not specifically limited herein.

The interface unit 58 is an interface connecting an external apparatus to the terminal 50. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 58 may be configured to receive input (for example, data information and power) from the external apparatus and transmit the received input to one or more elements in the terminal 50, or may be configured to transmit data between the terminal 50 and the external apparatus.

The memory 59 may be configured to store software programs and various data. The memory 59 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 59 may include a high-speed random access memory, and may further include a non-volatile memory such as at least one magnetic disk storage component, a flash memory component, or another volatile solid-state storage component.

The processor 510 is a control center of the terminal, and connects all parts of the entire terminal by using various interfaces and lines. By running or executing a software program and/or a module stored in the memory 59 and invoking data stored in the memory 59, the processor 510 performs various functions of the terminal and data processing, to perform overall monitoring on the terminal. The processor 510 may include one or more processing units. Optionally, the processor 510 may be integrated with an application processor and a modem processor. The application processor mainly processes the operating system, the user interface, applications, etc. The modem processor mainly processes wireless communication. It can be understood that alternatively, the modem processor may not be integrated into the processor 510.

The terminal 50 may also include a power supply 511 (for example, a battery) that supplies power to various components. Optionally, the power supply 511 may be logically connected to the processor 510 through a power supply management system, to perform functions of managing charging, discharging, and power consumption through the power supply management system.

In addition, the terminal 50 includes some functional modules not shown. Details are not described herein again.

Optionally, an embodiment of the present disclosure further provides a terminal, including a processor 510, a memory 59, and a computer program that is stored in the memory 59 and that can run on the processor 510. When the computer program is executed by the processor 510, each process of embodiments of the foregoing discontinuous reception DRX configuration method can be implemented, and a same technical effect can be achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer with a mobile terminal, and may be, for example, a portable, pocket-sized, handheld, computer built-in, or vehicle-mounted mobile apparatus, which exchange language and/or data with a radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal may also be referred to as a system, a subscriber unit, a subscriber station, a mobile station, a mobile console, a remote station, a remote terminal, an access terminal, a user terminal, a user agent, or a user device or user equipment. This is not limited herein.

An embodiment of the present disclosure further provides a computer-readable storage medium. The computer-readable storage medium stores a computer program, and when executing the computer program, a processor implements the foregoing processes of the embodiments of the foregoing discontinuous reception DRX configuration method and a same technical effect can be achieved. To avoid repetition, details are not described herein again. The computer-readable storage medium is, for example, a read-only memory (ROM), a random access memory (RAM), a magnetic disk, or an optical disc.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatus and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a computer readable storage medium. Based on such an understanding, the technical solutions of the present disclosure essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

In addition, it should be noted that in the apparatuses and methods of this disclosure, it is obvious that the components or the steps may be divided and/or recombined. These division and/or recombination should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any steps or components of the method and apparatus in the present disclosure may be implemented by hardware, firmware, software, or a combination thereof in any computing apparatus (including a processor, a storage medium, and the like) or a network of a computing apparatus. This can be implemented as long as those of ordinary skill in the art apply basic programming skill after reading the description of the present disclosure.

Therefore, the objective of this disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, apparently, the components or steps may be divided and/or recombined. These divisions and/or recombinations should be considered as equivalent solutions of this disclosure. Moreover, the steps for performing the foregoing series of processing may be performed naturally in chronological order according to a described sequence, but do not necessarily need to be performed in chronological order, and some steps may be performed in parallel or independently.

The optional implementations of the present disclosure are described above. It should be noted that a person of ordinary skill in the art may further make some improvements and refinements without departing from the principles described in the present disclosure and these improvements and refinements shall also fall within the protection scope of the present disclosure.

The invention claimed is:

1. A discontinuous reception (DRX) configuration method, performed by a terminal, comprising:
when the terminal is configured with at least two sets of DRX parameters, performing a corresponding DRX process according to at least one set of the at least two sets of DRX parameters in a first set of DRX parameters, a second set of DRX parameters and a third set of DRX parameters; wherein the first set of DRX parameters comprises parameters corresponding to a DRX on duration timer, the second set of DRX parameters comprises parameters corresponding to a DRX inactivity timer, and the third set of DRX parameters comprises parameters corresponding to a DRX retransmission timer; wherein each of the first set of DRX parameters, the second set of DRX parameters and the third set of DRX parameters comprises at least one of on duration, a short DRX cycle or a long DRX cycle;
wherein the performing a corresponding DRX process according to at least one set of the at least two sets of DRX parameters in the first set of DRX parameters, the second set of DRX parameters and the third set of DRX parameters comprises at least one of the following:
selecting the first set of DRX parameters in response to determining
that the terminal is in a state after a DRX on duration timer starts or when a DRX on duration timer runs;
selecting the second set of DRX parameters in response to determining that the terminal is in a state after a DRX inactivity timer starts or when a DRX inactivity timer runs; or
selecting the third set of DRX parameters in response to determining that the terminal is in a state after a DRX retransmission timer starts or when a DRX retransmission timer runs.

2. The discontinuous reception (DRX) configuration method according to claim 1, wherein the performing a corresponding DRX process according to at least one set of the at least two sets of DRX parameters of the terminal comprises:
when a DRX parameter is reconfigured or changed in the discontinuous reception (DRX) process, continuing to perform the corresponding DRX process according to at least one of a first DRX parameter or a second DRX parameter;
wherein the first DRX parameter is a DRX parameter before reconfiguration or before change, and the second DRX parameter is a DRX parameter after reconfiguration or after change.

3. The discontinuous reception (DRX) configuration method according to claim 2, before the continuing to perform the corresponding DRX process according to at least one of a first DRX parameter or a second DRX parameter, further comprising:
receiving change indication information of the DRX parameter.

4. The discontinuous reception (DRX) configuration method according to claim 2, the step of receiving change indication information of the DRX parameter comprises at least one of the following:
receiving downlink control information (DCI) used to explicitly or implicitly indicate change of the DRX parameter;
receiving a media access control control element (MAC CE) used to explicitly or implicitly indicate change of the DRX parameter;
receiving a radio resource control RRC message used to explicitly or implicitly indicate change of the DRX parameter; or
receiving an advance signal indication.

5. The discontinuous reception (DRX) configuration method according to claim 2, wherein the change indication information carries bandwidth part (BWP) switching information, after the step of receiving change indication information of the DRX parameter, the method further comprises:
switching a current BWP to a target BWP according to the BWP switching information, and using a DRX parameter corresponding to the target BWP.

6. The discontinuous reception (DRX) configuration method according to claim 2, wherein the step of continuing to perform the corresponding DRX process according to at least one of a first DRX parameter or a second DRX parameter comprises one of the following behaviors:
continuing to run a timer in the DRX process according to at least one of a first DRX parameter or a second DRX parameter;
restarting a timer in the DRX process according to at least one of a first DRX parameter and a second DRX parameter; or
stopping the DRX process, and performing a new DRX process according to the second DRX parameter.

7. The discontinuous reception (DRX) configuration method according to claim 6, wherein the step of continuing to run a timer in the DRX process according to at least one of a first DRX parameter or a second DRX parameter comprises one of the following:
according to the first DRX parameter, continuing to run a first timer that already runs in the DRX process;
according to the first DRX parameter, continuing to run a first timer that already runs in the DRX process and a second timer after the first timer;
according to the second DRX parameter, continuing to run a first timer that already runs in the DRX process;
according to the second DRX parameter, continuing to run a first timer that already runs in the DRX process and a second timer after the first timer; or
according to the first DRX parameter, continuing to run a first timer that already runs in the DRX process, and according to the second DRX parameter, running the second timer after the first timer.

8. The discontinuous reception (DRX) configuration method according to claim 6, after the step of continuing to run a timer in the DRX process according to at least one of a first DRX parameter or a second DRX parameter, further comprising:
running the timer in the DRX process according to the second DRX parameter from an $N^{th}$ DRX process after the DRX process; wherein N is an integer greater than or equal to 1.

9. The discontinuous reception (DRX) configuration method according to claim 6, wherein the timer comprises: at least one of a DRX on duration timer, a DRX inactivity timer, or a DRX retransmission timer;
wherein the step of restarting a timer in the DRX process comprises:
restarting a first timer that already runs in the DRX process.

10. The discontinuous reception (DRX) configuration method according to claim 9, wherein the first timer is the DRX inactivity timer, and the step of restarting a first timer that already runs in the DRX process comprises:
when receiving scheduled DCI, or when receiving DCI, a MAC CE, or an RRC message used to indicate the change of the DRX parameter, restarting a DRX inactivity timer that already runs in the DRX process.

11. The discontinuous reception (DRX) configuration method according to claim 9, wherein the first timer is the DRX retransmission timer, and the step of restarting a first timer that already runs in the DRX process comprises:
when receiving change indication information of the DRX parameter during running of the DRX retransmission timer, restarting at least one of the DRX inactivity timer or the DRX retransmission timer in the DRX process.

12. The discontinuous reception (DRX) configuration method according to claim 1, wherein the performing a corresponding DRX process according to at least one set of the at least two sets of DRX parameters comprises:
selecting autonomously a corresponding DRX parameter from the at least two sets of DRX parameters according to a state of the terminal, and performing the DRX process.

13. The discontinuous reception (DRX) configuration method according to claim 1, wherein different states of the terminal correspond to different DRX parameters respectively.

14. A terminal, comprising a processor, a memory, and a computer program that is stored in the memory and that can run on the processor, wherein the computer program is executed by the processor to implement:
when the terminal is configured with at least two sets of DRX parameters, performing a corresponding DRX process according to at least one set of the at least two sets of DRX parameters in a first set of DRX parameters, a second set of DRX parameters and a third set of DRX parameters; wherein the first set of DRX parameters comprises parameters corresponding to a DRX on duration timer, the second set of DRX parameters comprises parameters corresponding to a DRX inactivity timer, and the third set of DRX parameters comprises parameters corresponding to a DRX retransmission timer; wherein each of the first set of DRX parameters, the second set of DRX parameters and the third set of DRX parameters comprises at least one of on duration, a short DRX cycle or a long DRX cycle;
wherein the performing a corresponding DRX process according to at least one set of the at least two sets of DRX parameters in the first set of DRX parameters, the second set of DRX parameters and the third set of DRX parameters comprises at least one of the following:

selecting the first set of DRX parameters in response to determining that the terminal is in a state after a DRX on duration timer starts or when a DRX on duration timer runs;

selecting the second set of DRX parameters in response to determining that the terminal is in a state after a DRX inactivity timer starts or when a DRX inactivity timer runs; or selecting the third set of DRX parameters in response to determining that the terminal is in a state after a DRX retransmission timer starts or when a DRX retransmission timer runs.

15. The terminal according to claim 14, wherein the computer program is further executed by the processor to implement:

when a DRX parameter is reconfigured or changed in the discontinuous reception (DRX) process, continuing to perform the corresponding DRX process according to at least one of a first DRX parameter or a second DRX parameter;

wherein the first DRX parameter is a DRX parameter before reconfiguration or before change, and the second DRX parameter is a DRX parameter after reconfiguration or after change.

16. The terminal according to claim 15, wherein the computer program is further executed by the processor to implement:

before the continuing to perform the corresponding DRX process according to at least one of a first DRX parameter or a second DRX parameter, receiving change indication information of the DRX parameter.

17. The terminal according to claim 15, wherein the step of receiving change indication information of the DRX parameter comprises at least one of the following:

receiving downlink control information (DCI) used to explicitly or implicitly indicate change of the DRX parameter;

receiving a media access control control element (MAC CE) used to explicitly or implicitly indicate change of the DRX parameter;

receiving a radio resource control RRC message used to explicitly or implicitly indicate change of the DRX parameter; or receiving an advance signal indication.

18. The terminal according to claim 15, wherein the change indication information carries bandwidth part (BWP) switching information, and the computer program is further executed by the processor to implement:

after the step of receiving change indication information of the DRX parameter, switching a current BWP to a target BWP according to the BWP switching information, and using a DRX parameter corresponding to the target BWP.

19. A non-transitory computer readable storage medium, wherein the non-transitory computer readable storage medium stores a computer program, and the computer program is executed by a processor of a terminal to implement:

when the terminal is configured with at least two sets of DRX parameters, performing a corresponding DRX process according to at least one set of the at least two sets of DRX parameters in a first set of DRX parameters, a second set of DRX parameters and a third set of DRX parameters; wherein the first set of DRX parameters comprises parameters corresponding to a DRX on duration timer, the second set of DRX parameters comprises parameters corresponding to a DRX inactivity timer, and the third set of DRX parameters comprises parameters corresponding to a DRX retransmission timer; wherein each of the first set of DRX parameters, the second set of DRX parameters and the third set of DRX parameters comprises at least one of on duration, a short DRX cycle or a long DRX cycle;

wherein the performing a corresponding DRX process according to at least one set of the at least two sets of DRX parameters in the first set of DRX parameters, the second set of DRX parameters and the third set of DRX parameters comprises at least one of the following:

selecting the first set of (DRX) parameters in response to determining that the terminal is in a state after a DRX on duration timer starts or when a DRX on duration timer runs;

selecting the second set of DRX parameters in response to determining that the terminal is in a state after a DRX inactivity timer starts or when a DRX inactivity timer runs; or selecting the third set of DRX parameters in response to determining that the terminal is in a state after a DRX retransmission timer starts or when a DRX retransmission timer runs.

20. The non-transitory computer readable storage medium according to claim 19, wherein the computer program is further executed by the processor to implement:

when a DRX parameter is reconfigured or changed in the discontinuous reception (DRX) process, continuing to perform the corresponding DRX process according to at least one of a first DRX parameter or a second DRX parameter;

wherein the first DRX parameter is a DRX parameter before reconfiguration or before change, and the second DRX parameter is a DRX parameter after reconfiguration or after change.

* * * * *